Feb. 13, 1951     C. G. HUDSON     2,541,819
LIFTING TONGS FOR BOTTLES AND THE LIKE
Filed Jan. 2, 1947
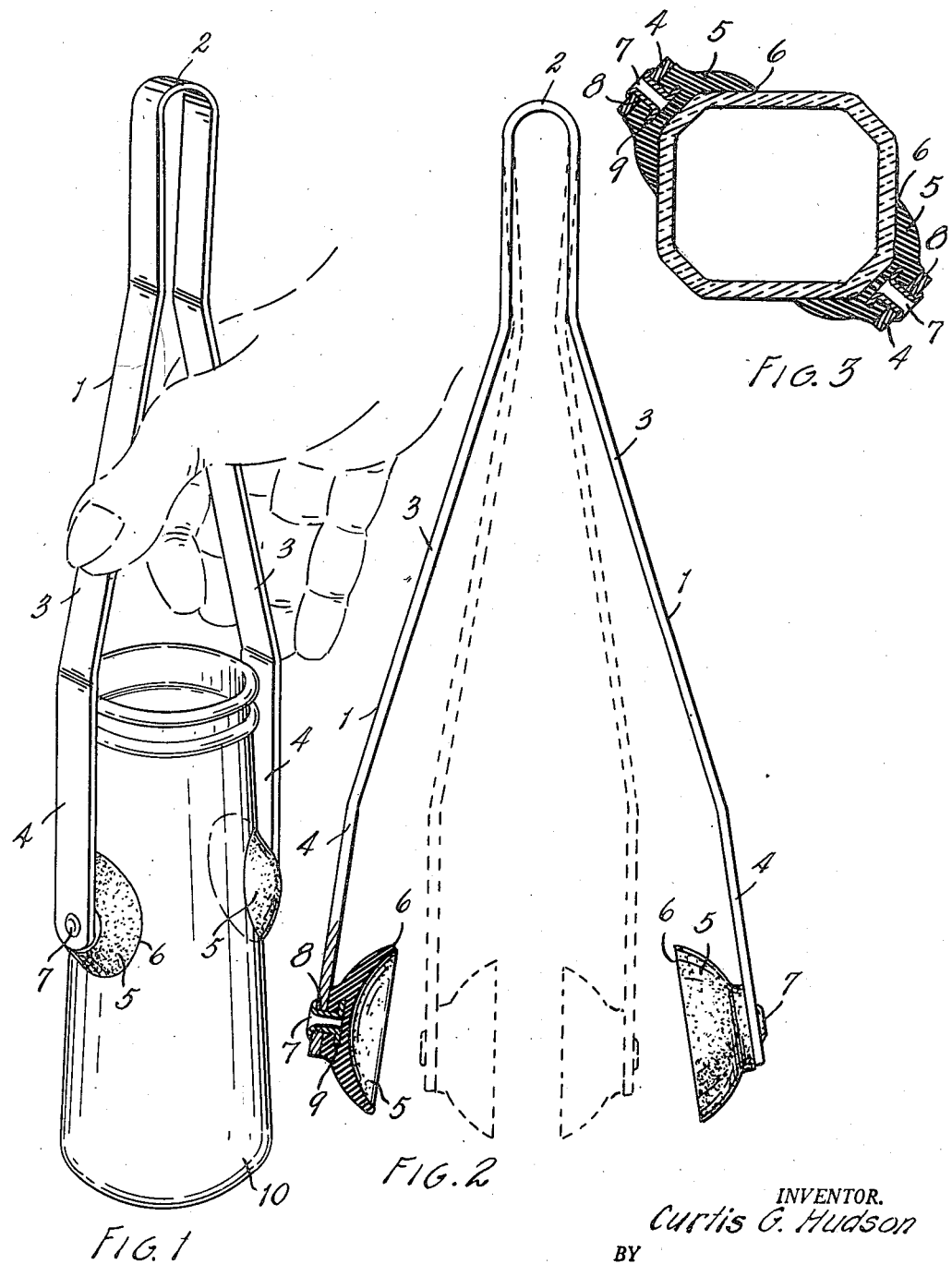
INVENTOR.
Curtis G. Hudson
BY
Arthur A. Earl
Attorney.

Patented Feb. 13, 1951

2,541,819

UNITED STATES PATENT OFFICE 2,541,819

LIFTING TONGS FOR BOTTLES AND THE LIKE

Curtis G. Hudson, Three Rivers, Mich., assignor of one-half to Oscar Brast, Three Rivers, Mich.

Application January 2, 1947, Serial No. 719,793

4 Claims. (Cl. 294—33)

This invention relates to lifting tongs for bottles and the like.

It is highly desirable that bottles, such as nursing bottles, in the preparation of cans for canning fruits and vegetables, and numerous other bottles, be sterilized by very hot water and they are, owing to their shape, difficult to handle. There are many other objects that desirably should be sterilized that are difficult to handle and many articles are broken because of an attempt to handle them when they are heated.

The main objects of this invention are:

First, to provide a lifting tongs which may be effectively engaged with an article such as a bottle or can without likelihood of injury or fracturing the same or dropping prior to releasing the tongs.

Second, to provide a lifting tongs having jaws which effectively engage or grip rounded surfaces or angled surfaces and objects of considerable variation in sizes and shape.

Third, to provide lifting tongs having these advantages which may be very economically produced and at the same time are easily manipulated and are very durable.

Objects relating to details and economies of the invention will appear from the description to follow. The invention is defined and pointed out in the claims.

A preferred embodiment of the invention is illustrated in the accompanying drawing, in which:

Fig. 1 is a perspective view of the tongs of the invention in gripping relation to a nursing bottle, a hand being illustrated to show the manner of manipulation.

Fig. 2 is a side view of the tongs of the invention shown in expanded or open position by full lines and in collapsed position by dotted lines, one of the jaws being shown in section.

Fig. 3 is a horizontal section through an octagonal bottle illustrating the manner of engagement of the jaws therewith.

The embodiment of the invention illustrated comprises the space arm designated generally by the numerals 1, 1 formed of flat springable steel stock and integrally joined at their outer end by the U-shaped springable loop 2. The arms comprise intermediate handle portions 3 disposed in diverging relation and terminating in the arm portions 4 disposed angularly to the diverging handle portions 3 so that when the handles are collapsed inwardly to gripping position, for example as shown by dotted lines in Fig. 2 and as shown in Fig. 1, the portions 4 are in substantially parallel relation.

The elastic resilient gripping jaws 5 are mounted on the inner sides of the arms at their inner ends, these jaws being of concavo-convex shape having relatively thin edges or lip portions 6, their walls being of increasing thickness from their edges to the center.

The mounting rivets 7 are arranged through holes 8 in the arms and upset on the outer sides thereof. The inner ends of these mounting rivets have heads 9 which are embedded in the jaws.

The jaws are of such resiliency and their edges 6 are thin enough and have elasticity enough so that they can conform to a rounded surface such as the surface of the nursing bottle 10 shown in Fig. 1, the jaws stretching out lengthwise of the bottle as they are pressed thereon and wrapping around the bottle so that they constitute a suction cup although the suction cup engagement is not essential in all cases of effective gripping.

In Fig. 3 I illustrate a polygonal-shaped bottle having side portions or panels of such dimensions that the jaws overlap—in the case illustrated two angles. The resilient jaws, however, would be effective in engaging a bottle of non-circular section where the panels are of such width that the jaws would engage only one angle.

It is highly desirable that the cup-shaped jaws should be flexible and quite elastic so that they readily conform to different shaped and dimensioned surfaces when pressed thereon.

The tongs illustrated were primarily designed by me as bottle lifting tongs well adapted for the handling or lifting of bottles, cans and the like from sterilizingly heated water. They are, however, adapted for use in handling certain tools and implements which are likewise commonly sterilized in very hot water, and other objects. The suction cup engagement is highly desirable for objects such as bottles and cans but is not so important in the handling of surgical tools and instruments but the jaws may be effectively engaged therewith to lift them from the sterilizing water or solution.

I have not attempted to illustrate or describe other designs and embodiments of the invention—that is, designs and embodiments for particular purposes as it is believed that this disclosure will enable those skilled in the art to embody or adapt the invention as may be desired.

Having thus described my invention, what I claim as new and desire to secure by Letters Patent is:

1. A bottle tongs comprising spaced diverging handles of flat springable stock integrally connected at their outer ends by a springable U- shaped loop and terminating at their inner ends in springable arms disposed angularly relative to the handles to lie in substantially parallel relation when the handles are collapsed to article gripping position, said arms being of flat springable stock throughout the length thereof, the plane of the flat stock in the arms being at substantially right angles to the plane of flexing of the arms, and concavo-convex jaws of elastic material secured on the inner sides of the arms at the inner ends thereof, the walls of the jaws having flexible annular peripheral edge portions, the peripheral edge portions of the jaws being relatively thin as compared to the central portions thereof, the peripheral edges of the jaws being conformable to a surface to be gripped, the concave sides of said jaws being disposed in opposed facing relation to each other, and being independently conformable to clampingly and suctioningly engage therebetween articles variously shaped on the opposite sides thereof, said springable supporting arms facilitating the concavo-convex jaws conforming to the shape of the surfaces to be gripped.

2. Lifting tongs of the class described comprising springable arms springably connected at their outer ends by an integral loop and spaced for gripping, and concavo-convex rubber jaws mounted on the arms at their inner ends and having walls relatively thin at their edges as compared to the thickness of the central portions thereof and of gradually increasing thickness from their edges toward the centers thereof, the concave sides of said jaws being disposed in opposed facing relation to each other, and being independently conformable to clampingly and suctioningly engage therebetween articles variously shaped on the opposite sides thereof, said springable supporting arms facilitating the concavo-convex jaws conforming to the shape of the surfaces to be gripped.

3. Lifting tongs of the class described comprising arms formed integrally of flat springable stock, the arms being integrally connected at their outer ends by a springable loop and being spaced for gripping, said arms being of flat springable stock throughout the length thereof, the plane of the flat stock in the arms being at substantially right angles to the plane of flexing of the arms, and concavo-convex stretchable resilient jaws mounted on the arms at their inner ends in opposed facing relation, said springable supporting arms facilitating the concavo-convex jaws conforming to the shape of the surfaces to be gripped.

4. Lifting tongs of the class described comprising spaced members constituting handles, and concavo-convex elastic jaws mounted in opposed relation at the inner end of the members, the peripheral edge portions of the jaws being relatively thin as compared to the central portions thereof, the concave sides of said jaws being disposed in opposed facing relation to each other, and being independently conformable to clampingly and suctioningly engage therebetween articles variously shaped on the opposite sides thereof.

CURTIS G. HUDSON.

REFERENCES CITED

The following references are of record in the file of this patent:

UNITED STATES PATENTS

| Number | Name | Date |
| --- | --- | --- |
| 220,390 | Koska | Oct. 7, 1879 |
| 427,555 | Conner | May 13, 1890 |
| 2,281,985 | Morgan | May 5, 1942 |
| 2,287,576 | Solomon | June 23, 1942 |
| 2,303,393 | Schmidt | Dec. 1, 1942 |